United States Patent
Vandenberg

[15] 3,639,267
[45] Feb. 1, 1972

[54] ORGANOZINC CATALYST COMPOSITION

[72] Inventor: Edwin J. Vandenberg, Wilmington, Del.
[73] Assignee: Hercules Incorporated, Wilmington, Del.
[22] Filed: Dec. 19, 1969
[21] Appl. No.: 886,774

Related U.S. Application Data

[63] Continuation-in-part of Ser. No. 18,862, Mar. 31, 1960, Pat. No. 3,536,634.

[52] U.S. Cl. ...................252/431, 260/2 A, 260/429.9
[51] Int. Cl. .................................................C07f 3/06
[58] Field of Search ...............252/431; 260/429.9, 2 A

[56] References Cited

UNITED STATES PATENTS

| | | | |
|---|---|---|---|
| 3,275,598 | 9/1966 | Garty et al. | 260/2 A X |
| 3,313,741 | 4/1967 | Velzmann et al. | 260/429.9 X |
| 3,385,800 | 5/1968 | Furukawa et al. | 260/2 A |
| 3,399,149 | 8/1968 | Garty et al. | 260/2 A |
| 3,427,259 | 2/1969 | Garty et al. | 260/2 A |

FOREIGN PATENTS OR APPLICATIONS

983,814  2/1965  Great Britain ..................260/2 A

*Primary Examiner*—Patrick P. Garvin
*Attorney*—Eleanor R. Bartholomew

[57] ABSTRACT

New catalysts are provided for the polymerization of epoxides and episulfides by reacting a dihydrocarbon zinc, such as a dialkylzinc, with water, a polyol or a polyhydric phenol in a molar ratio of said compound to the dihydrocarbon zinc within the range of from about 0.2 to about 1.2 and preferably within the range of 0.4 to 1.0. The exact nature of the zinc compound produced by the reaction is not known but it is essential that it retain some of the zinc-to-carbon bonds present in the dihydrocarbon zinc being so reacted.

7 Claims, No Drawings

ORGANOZINC CATALYST COMPOSITION

This application is a continuation-in-part of my U.S. application Ser. No. 18,862 filed Mar. 31, 1960, now U.S. Pat. No. 3,536,634, issued Oct. 27, 1970.

This invention relates to new catalysts for the polymerization of epoxides and more particularly to the zinc compounds produced by reacting an organozinc compound with certain polyfunctional compounds.

In accordance with this invention it has been discovered that greatly improved results are obtained in the polymerization of epoxides when there is used as the catalyst for the polymerization a dihydrocarbon zinc compound that has been reacted with a polyfunctional compound selected from the group consisting of water, nonaromatic polyols wherein there is at least one carbon between the COH groups, and polyhydric phenols. The amount of the water, glycol or phenol that is reacted with the dihydrocarbon zinc is critical and should be an amount within the range of from about 0.2 mole to about 1.2 moles of the polyfunctional compound per mole of dihydrocarbon zinc. When these catalysts are used in the polymerization of epoxides it has been found that the conversion and/or rate of polymerization and/or yield are greatly improved over the process when a diorganozinc which has not been reacted with one of these polyfunctional compounds is used as the catalyst. In addition, a much higher molecular weight polymer is obtained, and in some cases a more stereoregular polymer results.

Any organozinc compound having the formula ZnRR', where R and R' are hydrocarbon radicals that can be alike or different, can be reacted with the above-mentioned polyfunctional compounds to produce the catalysts of this invention. Exemplary of the dihydrocarbon zinc compounds that can be used for the preparation of the catalyst are dimethylzinc, diethylzinc, dipropylzinc, diisopropylzinc, di-n-butylzinc, diisobutylzinc, di-tert-butylzinc, diamylzinc, zinc dioctylzinc, dicyclohexylzinc, dicyclopentadienylzinc, diphenylzinc, etc. The dialkylzinc compounds being more readily obtained are generally preferred. Regardless of the dihydrocarbon zinc compound that is used, it should be reacted with water, a polyol or a polyhydric phenol in a molar ratio of from about 0.2 mole to about 1.2 moles, and preferably from about 0.4 mole to about 1.0 mole per mole of dialkylzinc compound. Below or above these ratios the product is of little value as a catalyst for the polymerization of epoxides, the polymerization being retarded or otherwise adversely affected, as for example, a liquid polymer being produced instead of a high-molecular weight solid polymer. The exact amount of the polyfunctional compound that is reacted with the organozinc compound will depend to some extent upon the diluent, temperature, the epoxide being polymerized, the desired molecular weight of the polymer to be produced, the method of preparing the catalyst, whether more than one polyfunctional compound is used, whether the polyfunctional compound is difunctional or tri-, tetra-, etc., functional, lesser amounts of the latter being required, etc.

As pointed out above, the diorganozinc used as the catalyst in accordance with this invention is reacted with water, a nonaromatic polyol wherein there is at least one carbon between the COH groups, or a polyhydric phenol. An alkylene glycol containing less than three carbon atoms; namely, ethylene glycol, is not operable since for some unexplainable reason, when a zinc dialkyl, as for example, diethylzinc, is reacted with ethylene glycol, even within the specified molar ratio, the product is not useful as a catalyst, essentially no polymerization of epoxides taking place when it is used. Any nonaromatic polyol, as for example, alkylene glycols and cycloaliphatic glycols, containing at least one carbon between the COH groups can be used for this purpose. Such alkylene glycols will have the general formula

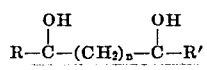

where R and R' can be hydrogen or alkyl and alike or different and $n$ is at least 1. Exemplary of the alkylene glycols and cycloaliphatic polyols that can be used are trimethylene glycol, tetramethylene glycol, pentamethylene glycol, 2-butene-1,4-diol, 2-butyne-1,4-diol, 1,3-cyclohexanediol, 1,4-cyclohexanediol, etc. Exemplary of the polyhydric phenols that can be used are resorcinol, hydroquinone, catechol, etc.

The exact nature of this reaction product of the dihydrocarbon zinc compound with the above-specified polyfunctional compounds is not known. It is believed that a reaction takes place whereby a portion of the hydrocarbon group of the dihydrocarbon zinc is replaced, as for example, when a dialkylzinc is reacted with the polyfunctional compound the alkyl group is replaced with the liberation of the alkane and replacement of the alkyl group with an O—H in the case of water or an OR-group in the case of polyols, the R depending upon the polyfunctional compound, or very likely, there is a reaction between two molecules of the dihydrocarbon zinc and the polyfunctional compound to produce a compound containing the —Zn—O—Zn— linkage. This theory is based on the fact that analysis of typical catalysts prepared in accordance with this invention be reacting diethylzinc with water in a molar ratio of 1:1 showed that there remained in the catalyst 0.6 and 0.9 ethyl group per mole of zinc, depending on the conditions under which it was prepared, and in a typical catalyst prepared by reaction of diethylzinc with tetramethylene glycol in a molar ratio of 0.8 mole of glycol to 1 mole of zinc alkyl there remained in the catalyst 0.7 ethyl group per mole of zinc. Regardless of what the theory of the reaction may be, it is essential that the reaction product retain zinc-carbon bonds in an amount of from about 0.1 to about 1.6 carbon bonds per zinc atom, and preferably from about 0.3 to about 1.2 carbon bonds per zinc atom, which catalysts are obtained when the organozinc compound is reacted with the polyfunctional compound in the above-specified molar ratios.

Any desired procedure can be used for reacting the dihydrocarbon zinc with the specified molar ratio of polyfunctional compound. Thus, the diorganozinc and polyfunctional compound can be reacted by adding the specified amount of the polyfunctional compound to a solution of the diorganozinc in an inert diluent, as for example, a hydrocarbon diluent, such as n-hexane, n-heptane, toluene, or an ether such as diethyl ether or a mixture of such diluents. These diorganozinc, water, polyol or polyphenol reaction products may be used immediately or aged, or if desired, heat treated in some cases. The reaction of the diorganozinc and the polyfunctional compound can be carried out at any convenient temperature, as for example, room temperature. In some cases it is desirable to react the two at low temperature, as for example, 0° C., and then age the mixture at room temperature.

In some cases it has been found to be advantageous to react the diorganozinc—polyfunctional compound reaction product with a complexing agent, as for example, an ether such as diethyl ether, tetrahydrofuran, etc., a tertiary amine, a tertiary phosphine, etc. The dihydrocarbon zinc can be reacted first with the water, polyol, or polyhydric phenol, and then with the complexing agent, or the complexing agent can be present while forming the catalyst. The amount of complexing agent reacted with the catalyst is generally within the range of from about 0.5 mole to about 30 moles, and preferably from about 1 to about 10 moles per mole of organozinc compound used in preparing the catalyst, depending on the complexing agent used.

Any epoxide can be homopolymerized or copolymerized with a second epoxide using the catalysts of this invention. Outstanding results are obtained with ethylene oxide, monosubstituted ethylene oxides

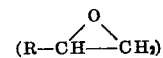

and symmetrically disubstituted ethylene oxides

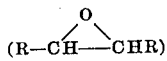

where R is a hydrocarbon radical such as alkyl, aryl, cycloalkyl, etc. Exemplary of such oxiranes that can be homopolymerized or copolymerized are the alkylene oxides such as ethylene oxide, propylene oxide, 1-butene oxide, 2-butene oxides, isobutylene oxide, 1-hexene oxide, and substituted alkylene oxides such as cyclohexene oxide, styrene oxide, glycidyl ethers of phenol, bis-phenol, etc., unsaturated epoxides such as vinyl cyclohexene, mono- and dioxides, butadiene monoxide, allyl glycidyl ether, etc. Halogen-containing epoxides can also be polymerized by this process and are particularly important in the preparation of copolymers of alkylene oxides. Exemplary of such halogen-containing epoxides that can be so polymerized or copolymerized are epichlorohydrin, epibromohydrin, epifluorohydrin, trifluoromethyl ethylene oxide, perfluoropropylene oxide, perfluoroethylene oxide, etc. Exemplary of the oxetanes that can be polymerized by the catalysts of this invention are oxetane, i.e., trimethylene oxide, 2-methyloxetane, 2-methoxyoxetane, 2-chloromethyloxetane; 2,2-bis(chloromethyl)oxetane; 2,2-bis(2-chloroethyl)oxetane; 2,2-dimethyloxetane; 2-chloro-2-methyloxetane, etc.

The catalysts of this invention are also useful for the polymerization of episulfides such as the thiiranes and the thietanes. Exemplary of these episulfides are ethylene sulfide, propylene sulfide, tetramethyl ethylene sulfide, butene-1 sulfide, the butene-2 sulfides, isobutylene sulfide, styrene sulfide, methoxymethyl ethylene sulfide; 1,2-diphenyl ethylene sulfide, trimethylene sulfide, 2-methylthietane; 2,2-dimethylthietane, 2-phenylthietane, etc.

Any amount of the diorganozinc reaction product prepared as described above can be used to catalyze the polymerization process from a minor catalytic amount up to a large excess, but in general, will be within the range of from about 0.2 to about 10 mole percent based on the zinc and the monomer being polymerized and preferably will be within the range of from about 1 to about 5 mole percent based on the zinc and the monomer or monomers being polymerized. The amount used depends in part on such factors as monomer purity, diluent purity, etc., less pure epoxides and diluents requiring more catalyst to destroy reactive impurities. In order to decrease catalyst consumption it is generally preferred that impurities such as carbon dioxide, oxygen, aldehydes, alcohols, etc., be kept at as low a level as practical.

The polymerization reaction can be carried out by any desired means, either as a batch or continuous process with the catalyst added all at one time or in increments during the polymerization or continuously throughout the polymerization. If desired, the monomer can be added gradually to the polymerization system. It can be carried out as a bulk polymerization process, in some cases at the boiling point of the monomer (reduced or raised to a convenient level by adjusting the pressure) so as to remove the heat of reaction. It can also be carried out in the presence of an inert diluent. Any diluent that is inert under the polymerization reaction conditions may be used as, for example, ethers such as the dialkyl, aryl or cycloalkyl ethers such as diethyl ether, dipropyl ether, diisopropyl ether, aromatic hydrocarbons such as benzene, toluene, etc., or saturated aliphatic hydrocarbons and cycloaliphatic hydrocarbons such as n-heptane, cyclohexane, etc. Obviously, any mixture of such diluents can be used and in many cases is preferable. The polymerization process can also be carried out in the presence of additives such as antioxidants, carbon black, zinc stearate, sulfur, some accelerators and other curatives, etc.

The polymerization process can be carried out over a wide temperature range and pressure. Usually, it will be carried out at a temperature from about −80° up to about 150° C., preferably within the range of from about −50° to about 120° C., and more preferably from about −30° to about 100° C. Usually, the polymerization process will be carried out at autogenous pressure, but superatmospheric pressures up to several hundred pounds may be used if desired and in the same way, subatmospheric pressures may also be used.

The following examples exemplify the preparation of the catalysts of this invention and the improved results that are obtained on polymerizing epoxides and/or episulfides with them. All parts and percentages are by weight unless otherwise indicated. The molecular weight of the polymers produced in these examples is shown by the reduced specific viscosity (RSV) given for each. By the term "Reduced Specific Viscosity" is meant the $\eta_{sp}/c$ determined on a 0.1 percent solution of the polymer in a given diluent.

EXAMPLES 1–6

The catalyst dispersions used in these examples were prepared from 0.49 part of diethylzinc by diluting n-heptane solutions of diethylzinc with ether to 0.5 M concentration except in example 2b where it was diluted to 0.4 M concentration and then adding an amount of water equal to the specified mole ratio, and agitating the mixture in the presence of glass beads at 30° C. for 20 hours. In the controls, examples 1a and 2a, neither ether nor water was added to the n-heptane solution of diethylzinc. The catalyst prepared and used in example 1b was analyzed by gas evolution to determine the amount of ethyl—zinc bonds present, and it was found to contain a mole ratio of ethyl to zinc of 0.9.

In each of these examples a polymerization vessel filled with nitrogen was charged with that part of the diluent not added with the catalyst (n-heptane in examples 1 and 2c, none in examples 3, 4 and 6, ether in examples 2a and b, and toluene in example 5) and 10 parts of the monomer or mixture of monomers. After equilibrating the vessel and contents at 30° C., the catalyst was injected. The polymerization reaction mixtures were agitated at 30° C. for 19 hours in examples 1–4 and 6, and 3.5 hours in example 5. In table I is set forth the monomer or monomers polymerized, the total parts of diluent and the percent thereof that was ether, and the catalyst.

The ether-insoluble polyethylene oxide produced in examples 1a–c was isolated by adding excess ether to the reaction mixture, filtering off the insoluble portion, washing it with ether, then with 0.5 percent hydrogen chloride in an 80:20 mixture of ether: methanol, with 80:20 ether:methanol alone, and then with ether containing 0.5 percent Santonox, i.e., 4,4'-thiobis(6-tert-butyl-m-cresol) and dried under vacuum for 16 hours at 50° C. The polymers produced in examples 2a–c, 3 and 6 were isolated in each case by adding sufficient ether to make the solution of a low enough viscosity for ease in handling, then washing the reaction mixture twice with a 3 percent aqueous solution of hydrogen chloride (stirring for 1 hour for each wash), washing with water until neutral, then with aqueous 2 percent sodium bicarbonate and again washing with water until neutral. After adding an amount of Santonox equal to 0.5 percent based on the polymer to the reaction mixture, the diluents were evaporated, and the polymer was dried for 16 hours at 80° C. at 0.4 mm. pressure. The poly(epichlorohydrin) produced in example 4 was isolated by diluting the reaction mixture with 40 parts of diethyl ether, separating the ether-insoluble polymer and washing it twice with ether. It was then purified by slurrying the insoluble polymer with a 1 percent solution of hydrogen chloride in ethanol, again collecting the insoluble polymer, washing it with methanol until neutral and then with a 0.4 percent solution of Santonox in methanol and finally drying the polymer for 16 hours at 50° C. under vacuum. The ethylene oxide—epichlorohydrin copolymer produced in example 5 was isolated by precipitating the polymer from the reaction mixture by adding 4 volumes of heptane, and then purifying the heptane-insoluble polymer as described for the ether-insoluble polyethylene oxide.

In table I is set forth the total percent conversion to polymer in each case together with the amount of isolated polymer produced in each case, indicated as percent conversion of the monomer or monomers to isolated polymer, and percent of the total polymer and the RSV of the polymer in the indicated diluent. In examples 1 and 4 where the isolated polymer was ether-insoluble, the conversion to ether-soluble polymer produced as determined by a total solids on an aliquot of the ether or heptane plus ether washes is set forth along with a description of the ether-soluble polymer.

The polypropylene oxide obtained in example 2b was rubbery and has an RSV of 1.5. It was recrystallized from a 1 percent acetone solution at −18° C. to give a crystalline, stereoregular, polypropylene oxide fraction equal to 12 percent of the total polymer. This fraction had an RSV of 5.5. The polypropylene oxide isolated in example 2c was a tough rubber, which on X-ray was shown to have a moderate crystallinity (pattern of stereoregular polypropylene oxide) and, hence, was a mixture of crystalline and amorphous polymer.

The poly(1-butene oxide) produced in example 3 was a rubbery solid. The poly(epichlorohydrin) produced in example 4 was amorphous by X-ray The ethylene oxide—epichlorohydrin copolymer produced in example 5 was a tough, somewhat rubbery, white film. On analysis it was found to contain 3.1 percent chlorine indicating that the copolymer contained 8.2 percent of epichlorohydrin. By X-ray it was shown to have a considerably amount of crystallinity.

The propylene oxide—allyl glycidyl ether copolymer produced in example 6 was a rubbery copolymer which on infrared analysis was shown to contain 8 percent of allyl glycidyl ether. A portion of this copolymer was fractionated by recrystallization from a 1 percent acetone solution at −18° C. to give a crystalline stereoregular, fraction equal to 20 percent of the total. This fraction has an RSV of 12.0 and was shown by X-ray to be highly crystalline and by infrared analysis to contain 10.1 percent allyl glycidyl ether. It was a strong, snappy rubber. It had an ultimate tensile strength of 1,450 p.s.i. (rate of elongation of 1 inch per minute) and an ultimate elongation of 350 percent. At an elongation rate of 20 in./min. it had a tensile strength of 860 p.s.i. and ultimate elongation of 350 percent. Thus, this copolymer had rubbery properties with considerably strength without vulcanization. The acetone-soluble fraction of this copolymer was equal to 75 percent of the total, has an RSV of 7.6. By X-ray it was shown to be largely amorphous and infrared analysis showed it to contain 10.0 percent of allyl glycidyl ether. It was rubbery but had no strength.

EXAMPLE 8

Propylene oxide (9 parts) and allyl glycidyl ether (1 part) were copolymerized in n-heptane as the sole diluent following the general procedure described in example 6. In this case the catalyst was prepared by reacting 0.25 part of diethylzinc in n-heptane (0.5 M solution) at 0° C. with water in a 1:1 molar ratio, the water being added over a period of 3 minutes while stirring, continuing the agitation for 15 minutes at 0° C. and then for 30 minutes at room temperature. The polymerization reaction was run for 19 hours at 30° C. The copolymer was isolated as described in example 6. It amounted to a conversion of 55 percent and had an RSV of 19.7. It was a snappy rubber.

EXAMPLE 9

In each of these runs propylene oxide and allyl glycidyl ether were copolymerized as described in example 6 except that the catalysts were prepared in each case by reacting a 0.49 part of diethylzinc (0.5 M solution in 70:30 ether:n-heptane) with water in the indicated molar ratio at 0° C. and then aging at room temperature for 2 hours prior to use. Each of the catalysts was analyzed to determine the ethyl-to-zinc bonds present. The amount of diluent present in each run was that present in the catalyst dispersion, 3,8 parts of 60:40 ether:heptane in run a the control and 5.2 parts of 70:30 ether:heptane in runs b–c. The polymerizations were run for 20 hours at 30° C. Tabulated below is the catalyst used, the molar ratio of ethyl group to zinc, the total percent conversion, percent conversion of isolated polymer, and the RSV of the copolymer.

| | | | Isolated polymer | |
|---|---|---|---|---|
| | | Total percent | Percent | |
| Catalyst | Ethyl/Zn | conv. | conv. | RSV |
| (a) ($C_2H_5)_2Zn$ | 2.0 | 5 | 4 | 0.03 |
| (b) $(C_2H_5)_2Zn \cdot 0.5H_2O$ | 1.4 | 15 | 13 | 0.18 |
| (c) $(C_2H_5)_2Zn \cdot 1.0H_2O$ | 0.6 | 36 | 36 | 9.4 |
| (d) $(C_2H_5)_2Zn \cdot 1.2H_2O$ | 0.20 | 23 | 15 | 6.2 |
| (e) $(C_2H_5)_2Zn \cdot 1.4H_2O$ | 0.15 | 1 | 1 | |

TABLE I

| Example | Monomer [1] | Diluent | | Catalyst | Total percent conv. | Isolated polymer | | Ether-soluble polymer | |
|---|---|---|---|---|---|---|---|---|---|
| | | Total parts | Percent ether | | | Percent conv. | RSV | Percent conv. | Description |
| 1a | Ethylene oxide | 34 | 0 | $(C_2H_5)_2Zn$ | 59 | Trace | | 59 | Liquid. |
| 1b | do | 33.8 | 7.4 | $(C_2H_5)_2Zn \cdot 1.0H_2O$ | 84 | 84 | [2] 72 | 0 | |
| 1c | do | 33.8 | 7.4 | $(C_2H_5)_2Zn \cdot 1.5H_2O$ | 0 | | | 0 | |
| 2a | Propylene oxide | 18.8 | 90 | $(C_2H_5)_2Zn$ | 2 | 2.7 | [3] 0.04 | | |
| 2b | do | 18.8 | 90 | $(C_2H_5)_2Zn \cdot 0.5H_2O$ | 6 | 6.4 | [3] 1.5 | | |
| 2c | do | 33.8 | 10.3 | $(C_2H_5)_2Zn \cdot 0.9H_2O$ | 100 | 99 | [3] 12 | | |
| 3 | 1-butene oxide | 5 | 70 | Same as above | 100 | 80 | [3] 7.5 | | |
| 4 | Epichlorohydrin | 5 | 70 | do | 7 | 5.8 | [4] 2.1 | 1 | Soft wax. |
| 5 | 80:20 EO:ECH | 41.7 | 8.4 | do | 17 | 17 | [2] 7.2 | | |
| 6 | 90:10 PO:AGE | 5 | 70 | do | 85 | 76 | [3] 15.4 | | |

[1] EO=Ethylene oxide; PO=Propylene oxide; ECH=Epichlorohydrin; AGE=Allyl glycidyl ether.
[2] Chloroform at 25° C.
[3] Benzene at 25° C.
[4] α-Chloronaphthalene at 100° C.

EXAMPLE 7

Ethylene oxide (10 parts) was polymerized by the general procedure described in example 1 except that in this case the catalyst was diethylzinc (0.49 part) in 5.0 parts of a mixture of ether and n-heptane containing 70 percent ether, which had been reacted with 0.9 mole of water per mole of zinc, agitated for 20 hours at 30° C. and then reacted with 1.0 mole of triethylamine per mole of zinc and again agitated for 20 hours at 30° C. The polymerization was run for 19 hours at 30° C., and the polymer was isolated as in example 1. A total conversion of 93 percent was obtained, all of which was ether-insoluble. This poly(ethylene oxide) had an RSV of 115.

EXAMPLE 10

A nitrogen filled polymerization vessel was charged with 9 parts of propylene oxide, 1 part of allyl glycidyl ether, 5 parts of high-abrasion furnace carbon black, and 0.1 part of phenyl β-naphthylamine. The catalyst used was prepared by reacting at 0° C., 0.98 part of diethylzinc with water in a 1:1 molar ratio in a 70:30 ether:n-heptane mixture (0.5 M concentration) and this catalyst dispersion was aged 4 hours at room temperature before use. The only diluent present in the polymerization was that added with the catalyst. The polymerization was run for 19 hours at 30° C. There was obtained a 100 percent conversion to copolymer.

EXAMPLES 11-20

In these examples ethylene oxide was polymerized using as the catalyst diethylzinc which had been prereacted with various polyhydroxy compounds. In each case 10 parts of ethylene oxide was polymerized using the general procedure described in examples 1-6, carrying out the polymerization for 19 hours in examples 11-15 and 26 and 21 hours in examples 16-20 at 30° C. The catalyst solutions were prepared as described in those examples, except that the water was replaced with the specified amount of the polyhydroxy compound. The initial heptane solution of diethylzinc was in each case diluted to 0.5 M concentration, except in examples 12, 15, 18 and 20 where the catalyst dispersions were diluted to 0.33 M concentration. The amount of catalyst used was prepared from 0.49 part of diethylzinc, except in the case of examples 12 and 15 when 0.31 part of diethylzinc was used. The ether-insoluble ethylene oxide produced in each case was isolated as described in examples 1-6. In table II is set forth the total parts of diluent which was a mixture of ether and n-heptane and the percent of ether therein, the catalyst used, together with total percent conversion, and the conversion to ether-insoluble polymer and ether-soluble polymer and the RSV of the ether-insoluble polymer

TABLE II

| Example: | Diluent Total parts | Diluent Percent ether | Catalyst | Total percent conversion | Ether-insoluble polymer Percent conversion | RSV |
|---|---|---|---|---|---|---|
| 11 | 33.8 | 10.3 | (C₂H₅)₂Zn·0.8 trimethylene glycol | 46 | 46 | >6.9 |
| 12 | 33.8 | 11.8 | (C₂H₅)₂Zn·0.8 tetramethylene glycol | 93 | 93 | 20 |
| 13 | 33.8 | 10.3 | (C₂H₅)₂Zn·0.8 pentamethylene glycol | 90 | 90 | 15.5 |
| 14 | 33.8 | 7.4 | (C₂H₅)₂Zn·0.5 resorcinol | 58 | 58 | 21 |
| 15 | 33.8 | 11.8 | (C₂H₅)₂Zn·0.8 hydroquinone | 27 | 22 | 4.4 |
| 16 | 34 | 11 | (C₂H₅)₂Zn·0.8 pyrocatechol | 62 | 62 | 4.8 |
| 17 | 34 | 11 | (C₂H₅)₂Zn·0.53 pyrogallol | 99 | 99 | 7.3 |
| 18 | 34 | 11 | (C₂H₅)₂Zn·0.53 glycerin | 100 | 100 | 21.7 |
| 19 | 34 | 11 | (C₂H₅)₂Zn·0.40 pentaerythritol | 29 | 28 | 4.5 |
| 20 | 34 | 19 | (C₂H₅)₂Zn·0.8 santonox | 73 | 73 | 6.0 |

EXAMPLE 21

The catalyst used in this example was prepared by slowly adding (during 3 minutes) 0.144 parts of water to a solution of 1.0 part of diethylzinc in 10.4 parts of n-heptane (a molar ratio of water to diethylzinc of 1:1) with agitation at 0° C. and then stirring at 0° C. an additional 15 minutes.

A polymerization vessel, free of air, was charged under nitrogen with 20 parts of oxetane, i.e., trimethylene oxide. After equilibrating at 30° C., the above catalyst solution was added. The polymerization was run 20.5 hours at 30° C. The reaction was then stopped by adding 8 parts of anhydrous ethanol, diluted with ether, and the insoluble polymer was collected and washed once with ether. It was then dissolved in an 80/20 mixture of ether/methanol containing 0.5 percent HCl. The polymer was recovered therefrom by precipitating with 5 volumes of methanol, collecting the precipitated polymer, washing neutral with ethanol and then once with methanol containing 0.05 percent of 4,4'-thiobis(6-tert-butyl-m-cresol), and then drying the polymer for 16 hours in vacuo at 80° C. There was thus isolated a 50 percent conversion of a rubbery solid which has an RSV of 2.0 as determined on a 0.1 percent solution of the polymer in chloroform at 25° C. It was then shown to have high crystallinity by X-ray

EXAMPLE 22

The catalyst used in this example was prepared as described in example 21, but reacting 0.25 part of diethylzinc in 5.4 parts of n-heptane with 0.036 part of water (molar ratio of 1:1) and then agitating the solution for 4 hours at 0° C. before using.

A polymerization vessel filled with nitrogen was charged with 5 parts of 3,3-bis(chloromethyl)oxetane and, after equilibrating at 30° C., the above catalyst solution was added. After 19 hours at 30° C., the polymerization was stopped by adding 2 parts of anhydrous ethanol. The reaction mixture was then diluted with about 40 parts of diethyl ether, after which, the ether-insoluble polymer was collected and washed twice with ether. It was purified by slurrying the insoluble polymer with a 1 percent solution of hydrogen chloride in ethanol. It was again collected, washed with methanol until neutral, then with a 0.4 percent solution of Santonox, i.e., 4,4'-thiobis(6-tert-butyl-m-cresol), in methanol and finally was dried for 16 hours at 80° C. under vacuum. There was obtained a 23 percent conversion of isolated polymer which had an RSV of 2.0 as measured on a 0.1 percent solution of the polymer in cyclohexanone at 50° C. It was shown to have moderate crystallinity (probably the alpha form) by X-ray. There was no ether-soluble polymer formed based on a total solids on the combined ether filtrates and washes.

EXAMPLE 23

The catalyst used in this example was prepared as described in example 21.

A polymerization vessel, free of air, was charged under nitrogen with 19.0 parts of oxetane, i.e., trimethylene oxide and 0.2 part of o-allylphenyl glycidyl ether. After equilibrating at 30° C., the above catalyst solution was added. An additional 0.2 part of o-allylphenyl glycidyl ether was added at the end of 2, 4, 6 and 8 hours. After a total of 16 hours, the reaction was stopped by adding 8 parts of anhydrous ethanol. The reaction mixture was then diluted with ether, and the insoluble polymer was collected and washed once with ether. It was then dissolved in an 80/20 mixture of ether/methanol containing 0.5 percent HCl. The polymer was recovered therefrom by precipitating with 5 volumes of methanol, collecting the precipitated polymer, washing neutral with ethanol and then once with methanol containing 0.05 percent of 4,4'-thiobis(6-tert-butyl-m-cresol), and then drying the polymer for 16 hours in vacuo at 80° C. There was thus isolated a 50 percent conversion of a rubbery solid which was shown by bromine analysis to contain approximately 5 percent of the o-allylphenyl glycidyl ether. This copolymer had an RSV of 2.0 as determined on a 0.1 percent solution of the polymer in chloroform at 25° C.

EXAMPLE 24

The catalyst used in this example was prepared by reacting 0.60 parts of diethylzinc in a 77:23 mixture of ether and n-heptane with water in a molar ratio of water to diethylzinc of 0.9:1 as described in examples 1-6.

A polymerization vessel with a nitrogen atmosphere was charged with 242 parts of anhydrous toluene and 50 parts of propylene sulfide. After equilibrating at 30° C., the above catalyst was added and the polymerization mixture was agitated at 30° C. for 19 hours. The reaction was stopped by adding 20 parts of anhydrous ethanol. The reaction mixture was diluted with toluene, and then was washed with aqueous hydrogen chloride, water, and sodium bicarbonate. The product was soluble in the solvent, and, after stabilization by adding 0.1 percent phenyl-β-naphthylamine, it was recovered by evaporation and dried for 16 hours at 80° C. under vacuum. The polymer was obtained in a 100 percent conversion and has an RSV of 3.4.

EXAMPLE 25

Trimethylene sulfide (29.5 parts) was polymerized at 30° C. for 139 hours using a total of 2.7 parts of a diethylzinc which had been reacted with 0.9 mole of water in 28 parts of a 77:23 mixture of ether and n-heptane, the catalyst being added in 2 equal parts at 0 and 94 hours. After stopping the reaction by adding 12 parts of anhydrous ethanol, the reaction mixture was washed twice with 3 percent aqueous hydrogen chloride, washed neutral with water, washed once with a 2 percent aqueous solution of sodium bicarbonate and again washed neutral with water. The ether-insoluble polymer recovered was washed twice with ether and then once with ether containing 0.05 percent of phenyl-β-naphthylamine as stabilizer, after which it was dried for 16 hours at 80° C. under vacuum. The polymer was obtained in a 36 percent conversion, and it was a crystalline polymer having an RSV of 3.3.

What I claim and desire to protect by Letters Patent is:

1. A polymerization catalyst consisting essentially of the modified organozinc compound formed by reacting a dihydrocarbon zinc compound free of ethylenic unsaturation with a polyfunctional compound selected from the group consisting of water, alkylene glycols and cyloaliphatic hydrocarbon polyols, wherein there is at least one carbon between the COH groups, and polyhydric phenols, in an amount such that the molar ratio of polyfunctional compound to the dihydrocarbon zinc is within the range of from about 0.2:1 to about 1.2:1 and such that said modified organozinc compound retains from about 0.1 to about 1.6 of the zinc-to-carbon bonds present in the dihydrocarbon zinc compound so reacted.

2. The catalyst of claim 1 wherein the dihydrocarbon zinc reacted is a dialkylzinc.

3. The catalyst of claim 2 wherein the polyfunctional compound reacted with the dialkylzinc is water in an amount such that the molar ratio of water to dialkylzinc is within the range of from about 0.4:1 to about 1:1.

4. The catalyst of claim 2 wherein the polyfunctional compound reacted with the dialkylzinc is an alkylene glycol in an amount such that the molar ratio of alkylene glycol to dialkylzinc is within the range of from about 0.4:1 to about 1:1.

5. The catalyst of claim 2 wherein the polyfunctional compound reacted with the dialkylzinc is a polyhydric phenol in an amount such that the molar ratio of polyhydric phenol to dialkylzinc is within the range of from about 0.4:1 to about 1:1.

6. The catalyst of claim 4 wherein the alkylene glycol is tetramethylene glycol.

7. The catalyst of claim 5 wherein the polyhydric phenol is resorcinol.

* * * * *